(12) United States Patent
Jordan et al.

(10) Patent No.: US 10,711,453 B1
(45) Date of Patent: Jul. 14, 2020

(54) BUILDING PANEL WITH A WEATHER BARRIER

(71) Applicant: Georgia-Pacific Panel Products, LLC, Atlanta, GA (US)

(72) Inventors: Richard D. Jordan, Lawrenceville, GA (US); John L. Bennett, Nicholson, GA (US); Robert W. Burkhardt, Dacula, GA (US)

(73) Assignee: Georgia-Pacific Panel Products LLC, Atlanta, GA (US)

( * ) Notice: Subject to any disclaimer, the term of this patent is extended or adjusted under 35 U.S.C. 154(b) by 245 days.

(21) Appl. No.: 15/392,996

(22) Filed: Dec. 28, 2016

Related U.S. Application Data

(60) Provisional application No. 62/340,673, filed on May 24, 2016, provisional application No. 62/272,277, filed on Dec. 29, 2015.

(51) Int. Cl.
*B32B 5/18* (2006.01)
*E04B 1/62* (2006.01)
(Continued)

(52) U.S. Cl.
CPC ............... *E04B 1/625* (2013.01); *B32B 5/18* (2013.01); *B32B 7/12* (2013.01); *B32B 21/06* (2013.01); *E04B 1/66* (2013.01); *E04C 2/26* (2013.01); *E04C 2/44* (2013.01); *B32B 2255/12* (2013.01); *B32B 2307/7265* (2013.01); *B32B 2307/744* (2013.01); *B32B 2607/00* (2013.01)

(58) Field of Classification Search
CPC ... E04B 1/625; E04B 1/66; B32B 5/18; B32B 7/12; B32B 21/06; B32B 2255/12; B32B 2307/7265; B32B 2307/744; B32B 2607/00; E04C 2/26; E04C 2/44
See application file for complete search history.

(56) References Cited

U.S. PATENT DOCUMENTS

| | | |
|---|---|---|
| 1,257,144 A | 2/1918 | Stanwood |
| 2,044,782 A | 6/1936 | Harshberger |

(Continued)

FOREIGN PATENT DOCUMENTS

| | | |
|---|---|---|
| WO | 1999029978 A1 | 6/1999 |
| WO | 2003/091508 A1 | 11/2003 |

(Continued)

OTHER PUBLICATIONS

LSU College of Agriculture; Hazard Resistant: Wind-resistant Roofs and Attachments; Jul. 26, 2011.

(Continued)

*Primary Examiner* — Travis M Figg

(57) ABSTRACT

A sheathing panel includes a barrier overlay secured to a panel; wherein the sheathing panel is bulk water resistant and has at least one of the following properties: a water vapor transmission rate of at least 7.0 grams per square meter per 24 hours (grams/m²/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m²) at 75 pascals (Pa) as determined by ASTM E2357-11.

17 Claims, 9 Drawing Sheets

(51) Int. Cl.
  *E04B 2/00* (2006.01)
  *E04B 1/66* (2006.01)
  *E04C 2/26* (2006.01)
  *B32B 7/12* (2006.01)
  *B32B 21/06* (2006.01)

(56) References Cited

U.S. PATENT DOCUMENTS

| | | | |
|---|---|---|---|
| 2,144,168 A | 1/1939 | Sherriff | |
| 2,226,239 A | 12/1940 | Elmendorf | |
| 2,246,514 A | 6/1941 | Harris | |
| 3,041,219 A | 6/1962 | Steck | |
| 3,111,787 A | 11/1963 | Chamberlain | |
| 3,448,001 A | 6/1969 | Jarvi | |
| 3,468,086 A | 9/1969 | Warner | |
| 3,522,138 A | 7/1970 | Lee | |
| 3,654,044 A | 4/1972 | Hirota | |
| 3,900,102 A | 8/1975 | Hurst | |
| 3,909,998 A | 10/1975 | Simpson et al. | |
| 3,969,181 A | 7/1976 | Seabold | |
| 4,021,981 A | 5/1977 | Van Wagoner | |
| 4,053,339 A | 10/1977 | Story et al. | |
| 4,132,220 A | 1/1979 | Thomason | |
| 4,160,346 A | 7/1979 | Kaufmann | |
| 4,172,830 A | 10/1979 | Rosenberg et al. | |
| 4,194,335 A | 3/1980 | Diamond | |
| 4,326,909 A | 4/1982 | Slavik | |
| 4,404,252 A | 9/1983 | Hetzler et al. | |
| 4,405,675 A | 9/1983 | Dessens | |
| 4,601,935 A | 7/1986 | Metcalf et al. | |
| 4,689,275 A | 8/1987 | Sandman | |
| 4,775,567 A | 10/1988 | Harkness | |
| 4,825,616 A | 5/1989 | Bondoc et al. | |
| 4,828,635 A | 5/1989 | Flack et al. | |
| 4,888,930 A | 12/1989 | Kelly | |
| 4,924,644 A | 5/1990 | Lewis | |
| 4,929,303 A | 5/1990 | Sheth | |
| 4,936,071 A | 6/1990 | Karrfalt | |
| 4,937,992 A | 7/1990 | Dawson et al. | |
| 4,965,119 A | 10/1990 | Sancaktar | |
| 4,974,382 A | 12/1990 | Avellanet | |
| 4,992,315 A | 2/1991 | Zickell et al. | |
| 4,992,331 A | 2/1991 | Decoste, Jr. | |
| 4,999,064 A | 3/1991 | Knaepen | |
| 5,093,185 A | 3/1992 | Ungar et al. | |
| 5,096,759 A | 3/1992 | Simpson et al. | |
| 5,134,831 A | 8/1992 | Avellanet | |
| 5,187,000 A | 2/1993 | Chow et al. | |
| 5,231,814 A | 8/1993 | Hageman | |
| 5,236,757 A | 8/1993 | Probst et al. | |
| 5,251,416 A | 10/1993 | White | |
| 5,270,119 A | 12/1993 | Yanutola | |
| 5,335,473 A | 8/1994 | Chase | |
| 5,374,477 A | 12/1994 | Lawless et al. | |
| 5,425,976 A | 6/1995 | Clarke et al. | |
| 5,497,596 A | 3/1996 | Zatkulak | |
| 5,515,659 A | 5/1996 | MacDonald et al. | |
| 5,617,687 A | 4/1997 | Bussey et al. | |
| 5,632,095 A | 5/1997 | Day | |
| 5,647,934 A | 7/1997 | Vaders et al. | |
| 5,661,937 A | 9/1997 | Doppler et al. | |
| 5,687,517 A | 11/1997 | Wiercinski et al. | |
| 5,700,570 A | 12/1997 | Fahmy | |
| 5,711,124 A | 1/1998 | Stough et al. | |
| 5,718,786 A | 2/1998 | Lindquist et al. | |
| 5,733,824 A | 3/1998 | Brunka et al. | |
| 5,759,670 A | 6/1998 | Bussey et al. | |
| 5,766,721 A | 6/1998 | Bussey et al. | |
| 5,787,665 A | 8/1998 | Carlin et al. | |
| 5,815,995 A * | 10/1998 | Adam | A47L 23/24 |
| | | | 52/177 |
| 5,822,940 A | 10/1998 | Carlin et al. | |
| 5,837,620 A | 11/1998 | Kajander | |
| 5,843,552 A | 12/1998 | Karrfalt | |
| 5,859,114 A | 1/1999 | Davis et al. | |
| 5,881,521 A | 3/1999 | Porter et al. | |
| 5,891,282 A | 4/1999 | Stough et al. | |
| 5,955,203 A | 9/1999 | Briggs et al. | |
| 5,989,668 A | 11/1999 | Nelson et al. | |
| 6,023,906 A | 2/2000 | Folkersen | |
| 6,120,869 A | 9/2000 | Cotsakis et al. | |
| 6,131,353 A | 10/2000 | Egan | |
| 6,133,168 A | 10/2000 | Doyle et al. | |
| 6,187,127 B1 | 2/2001 | Bolitsky et al. | |
| 6,209,283 B1 | 4/2001 | Folkersen | |
| 6,226,946 B1 | 5/2001 | Stough et al. | |
| 6,235,365 B1 | 5/2001 | Schaughency et al. | |
| 6,251,495 B1 | 6/2001 | Wilson et al. | |
| 6,253,530 B1 | 7/2001 | Price et al. | |
| 6,279,284 B1 | 8/2001 | Moras | |
| 6,293,069 B1 | 9/2001 | Monda et al. | |
| 6,303,207 B1 | 10/2001 | Kajander | |
| 6,308,491 B1 | 10/2001 | Porter | |
| 6,331,339 B1 | 12/2001 | Kajander | |
| 6,355,333 B1 | 3/2002 | Waggoner et al. | |
| 6,379,786 B1 | 4/2002 | Takeshita et al. | |
| 6,434,897 B1 * | 8/2002 | Sievers | B28D 1/221 |
| | | | 52/177 |
| 6,455,151 B1 | 9/2002 | Sakashita et al. | |
| 6,460,304 B1 | 10/2002 | Kim | |
| 6,516,580 B1 | 2/2003 | Maietta | |
| 6,578,331 B1 | 6/2003 | Leslie | |
| 6,581,348 B2 | 6/2003 | Hunter | |
| 6,656,858 B1 | 12/2003 | Cahill | |
| 6,673,417 B1 | 1/2004 | Gudet | |
| 6,675,544 B1 | 1/2004 | Ou et al. | |
| 6,701,685 B2 | 3/2004 | Rippey | |
| 6,715,249 B2 | 4/2004 | Rusek et al. | |
| 6,737,155 B1 | 5/2004 | Du | |
| 6,769,215 B1 | 8/2004 | Carkner | |
| 6,772,569 B2 | 8/2004 | Bennett et al. | |
| 6,800,352 B1 | 10/2004 | Hejna et al. | |
| 6,804,922 B1 | 10/2004 | Egan et al. | |
| 6,854,228 B2 | 2/2005 | Arseneau et al. | |
| 6,868,643 B1 | 3/2005 | Williams | |
| 6,892,498 B1 | 5/2005 | Roman | |
| 6,901,712 B2 | 6/2005 | Lionel | |
| 6,925,766 B2 | 8/2005 | Dipede | |
| 6,926,785 B2 | 8/2005 | Tanzer et al. | |
| 6,988,343 B2 | 1/2006 | Gleeson et al. | |
| 7,021,018 B2 | 4/2006 | Peng | |
| 7,037,864 B2 | 5/2006 | Faucher | |
| 7,148,160 B2 | 12/2006 | Porter | |
| 7,150,128 B2 | 12/2006 | Schuman et al. | |
| 7,155,868 B2 | 1/2007 | Cole et al. | |
| 7,159,368 B2 | 1/2007 | Peng | |
| 7,378,044 B1 | 5/2008 | Hejna et al. | |
| 7,487,624 B2 | 2/2009 | Baba | |
| 7,501,357 B2 | 3/2009 | Carroll et al. | |
| 7,550,187 B2 | 6/2009 | Seth et al. | |
| 7,658,040 B2 | 2/2010 | Bennett et al. | |
| 7,677,002 B2 | 3/2010 | Bennett et al. | |
| 7,721,506 B2 | 5/2010 | Bennett et al. | |
| 7,829,197 B2 | 11/2010 | Chen et al. | |
| 7,838,104 B2 | 11/2010 | Chen et al. | |
| 7,838,123 B2 * | 11/2010 | Chen | B32B 27/06 |
| | | | 428/292.1 |
| 7,866,100 B2 | 1/2011 | Bennett et al. | |
| 7,870,694 B2 | 1/2011 | Bennett et al. | |
| 7,877,938 B2 | 2/2011 | Bennett et al. | |
| 7,972,981 B2 | 7/2011 | Anderson et al. | |
| 7,984,591 B2 | 7/2011 | Cashin et al. | |
| 8,112,950 B2 | 2/2012 | Bennett et al. | |
| 8,215,083 B2 | 7/2012 | Toas et al. | |
| 8,222,164 B2 | 7/2012 | Anderson et al. | |
| 8,328,968 B2 | 12/2012 | Anderson et al. | |
| 8,474,197 B2 | 7/2013 | Bennett et al. | |
| 8,590,217 B2 | 11/2013 | Gleeson et al. | |
| 8,590,267 B2 | 11/2013 | Jaffee | |
| 2001/0010141 A1 | 8/2001 | Folkersen | |
| 2001/0021448 A1 | 9/2001 | Kajander | |
| 2001/0028943 A1 | 10/2001 | Mashiko et al. | |
| 2002/0018908 A1 | 2/2002 | Smith et al. | |
| 2002/0100249 A1 | 8/2002 | Peng et al. | |

(56) References Cited

U.S. PATENT DOCUMENTS

| | | | |
|---|---|---|---|
| 2002/0132547 | A1 | 9/2002 | Grondin et al. |
| 2003/0054127 | A1 | 3/2003 | Heifetz |
| 2003/0079431 | A1 | 5/2003 | Schuman et al. |
| 2003/0113534 | A1 | 6/2003 | Poisson |
| 2003/0126817 | A1 | 7/2003 | Gleeson et al. |
| 2003/0129348 | A1 | 7/2003 | Peng |
| 2003/0131550 | A1 | 7/2003 | Cole et al. |
| 2003/0199217 | A1 | 10/2003 | Cashin et al. |
| 2004/0029469 | A1 | 2/2004 | Anderson et al. |
| 2004/0071927 | A1 | 4/2004 | Murphy et al. |
| 2004/0103608 | A1 | 6/2004 | Lionel |
| 2004/0180195 | A1 | 9/2004 | Macuga |
| 2004/0226247 | A1* | 11/2004 | Byrd .................. E04D 3/35 52/518 |
| 2005/0011155 | A1 | 1/2005 | Ponting et al. |
| 2005/0016088 | A1 | 1/2005 | Pursall et al. |
| 2005/0042957 | A1 | 2/2005 | McDonald et al. |
| 2005/0118446 | A1 | 6/2005 | Faucher |
| 2005/0229504 | A1* | 10/2005 | Bennett .................. E04B 1/68 52/105 |
| 2005/0229524 | A1* | 10/2005 | Bennett .................. B32B 21/06 52/481.1 |
| 2005/0257469 | A1* | 11/2005 | Bennett .................. E04B 7/22 52/408 |
| 2006/0019568 | A1 | 1/2006 | Toas et al. |
| 2006/0034381 | A1 | 2/2006 | Ionescu et al. |
| 2006/0048464 | A1 | 3/2006 | Suzuki et al. |
| 2006/0053737 | A1 | 3/2006 | Jaffee |
| 2006/0053738 | A1 | 3/2006 | Jaffee |
| 2006/0053739 | A1 | 3/2006 | Jaffee |
| 2006/0059852 | A1 | 3/2006 | Toas et al. |
| 2006/0141191 | A1 | 6/2006 | Seth et al. |
| 2006/0160453 | A1 | 7/2006 | Suh |
| 2007/0015424 | A1 | 1/2007 | Toas et al. |
| 2007/0044397 | A1 | 3/2007 | Wiercinski et al. |
| 2007/0130867 | A1 | 6/2007 | Flaherty |
| 2007/0178793 | A1 | 8/2007 | Gerello |
| 2008/0141604 | A1 | 6/2008 | Arthurs et al. |
| 2008/0145681 | A1 | 6/2008 | Toas et al. |
| 2008/0190048 | A1 | 8/2008 | Kitakado |
| 2009/0162596 | A1* | 6/2009 | Rios .................. B25G 1/10 428/45 |
| 2009/0162651 | A1* | 6/2009 | Rios .................. B32B 3/30 428/354 |
| 2009/0202852 | A1 | 8/2009 | Chen |
| 2011/0135879 | A1 | 6/2011 | Bennett et al. |
| 2011/0197528 | A1 | 8/2011 | Egan et al. |
| 2011/0269363 | A1 | 11/2011 | Cashin et al. |
| 2013/0026172 | A1 | 1/2013 | Asakawa et al. |
| 2013/0082414 | A1 | 4/2013 | Anderson et al. |
| 2013/0247490 | A1* | 9/2013 | Strait .................. E04D 12/002 52/302.1 |
| 2013/0283715 | A1* | 10/2013 | Bennett .................. B32B 21/14 52/408 |
| 2014/0120301 | A1* | 5/2014 | Jordan .................. B32B 21/02 428/106 |

FOREIGN PATENT DOCUMENTS

| | | |
|---|---|---|
| WO | 2006034381 A2 | 3/2006 |
| WO | 2013026172 A1 | 2/2013 |

OTHER PUBLICATIONS

LSU College of Agriculture; Teaching Center Roof No. 2; Feb. 29, 2012.

Modern Materials; Deniz Carroll; "The Expanding Role of EPS in Construction"; Nov. 2003.

Non-Final Office Action dated Jun. 19, 2009, U.S. Appl. No. 11/029,293, filed Jan. 4, 2005, Title: "Panelized Roofing System and Method," First Named Inventor: John L. Bennett.

Non-Final Office Action dated Mar. 17, 2009, U.S. Appl. No. 11/029,535, filed Jan. 4, 2005, Title: "Panel for Sheathing System and Method," First Named Inventor: John L. Bennett.

OHCD/PHDC/RDA Small Building Specifications; May 2011.

OHCD-PHDC-RDA Constructions Specifications; Thermal and Moisture Protection; May 2001.

RoyOMartin; Eclipse Reflective Housewrap Product Information and Installation Manual 01; Mar. 2015.

RoyOMartin; Eclipse Reflective Housewrap, Mar. 2015; Webpage, https://products.royomartin.com/eclipse.

RoyOMartin; Exterior Sheathing; Dec. 15, 2010.

RoyOMartin; FSC-Certified Products; Webpage, https://products.royomartin.com/products/fscr-certified-products.

Sea Grant North Carolina; Coastwatch; Ann Green; "Hurricane Resistance: Retrofitting, Storm Shutters Increase Safety"; Early Summer 2002.

Sto Technical Report 01-07.3—StoGuard: Testing for International Building Code Compliance and Comparison to Sheet Water-Resistive Barrier Products, 2007.

Thermo-ply Structural Sheathing; Product Brochure from website, 2014, http://oxengineeredproducts.com/wp-content/uploads/2014/11/TPly-Product-InfoWeb-10_29_14.pdf.

TiteSeal®, RoofDeck Seam Tape; http://www.cofair.com/sheathingtape.aspx, Cofair Products Inc.

U.S. Appl. No. 60/547,029, filed Feb. 23, 2004, Bennett et al., provisional application.

U.S. Appl. No. 60/547,031, filed Feb. 23, 2004, Bennett et al., provisional application.

APA; HDO/MDO Plywood Product Guide; 2002.

APA; HDO/MDO Plywood Product Guide; 2011.

Arnold et al., Installing Housewrap, When properly detailed, high-tech wrappings can reduce the flow of air into outside walls while allowing moisture to escape, Fine Homebuilding, Feb./Mar. 1997, No. 107, pp. 44-49.

ASTM International; "Standard Practice for Operating Fluorescent Ultraviolet (UV) Lamp Apparatus for Exposure of Nonmetallic Materials," 2012; 12 pages.

ASTM International; "Standard Test Method for 90 Degree Peel Resistance of Adhesives," Designation: D6862-11; 2011; 6 pages.

ASTM International; "Standard Test Method for Determination of Liquid Water Absorption of Coated Hardboard and Other Composite Wood Products via 'Cobb Ring' Apparatus," Designation: 05795-95; 1995 (Reapproved 2008); 3 pages.

ASTM International; "Standard Test Method for Determining the Static Coefficient of Friction of Ceramic Tile and Other Like Surfaces by the Horizontal Dynamometer Pull-Meter Method," 2007.

ASTM International; "Standard Test Method for Using a Variable Incidence Tribometer (VIT)," Designation: F 1679-04; 2004; 3 pages.

ASTM International; "Standard Test Methods for Water Vapor Transmission of Materials," Designation: E96/E96M-10; 2010; 12 pages.

Bennett; Non-Final Office Action for U.S. Appl. No. 11/029,300, filed Jan. 4, 2005, dated Dec. 13, 2007.

Bennett; Non-Final Office Action for U.S. Appl. No. 11/029,535, filed Jan. 4, 2005, dated Dec. 12, 2007.

Bennett; Non-Final Office Action for U.S. Appl. No. 12/647,249, filed Dec. 24, 2009, dated May 11, 2010.

Bennett; Non-Final Office Action for U.S. Appl. No. 12/701,260, filed Feb. 5, 2010, dated Apr. 22, 2010.

Bennett; Non-Final Office Action for U.S. Appl. No. 12/722,787, filed Mar. 12, 2010, dated Apr. 22, 2010.

Bennett; Non-Final Office Action for U.S. Appl. No. 12/987,125, filed Jan. 9, 2011, dated Aug. 9, 2011.

Bennett; Notice of Allowance for U.S. Appl. No. 11/029,293, filed Jan. 4, 2005, dated Jan. 11, 2010.

Bennett; Notice of Allowance for U.S. Appl. No. 11/029,300, filed Jan. 4, 2005, dated Jun. 26, 2009.

Bennett; Notice of Allowance for U.S. Appl. No. 11/029,300, filed Jan. 4, 2005, dated Oct. 13, 2009.

Bennett; Notice of Allowance for U.S. Appl. No. 11/029,535, filed Jan. 4, 2005, dated Sep. 21, 2009.

(56) References Cited

OTHER PUBLICATIONS

Bennett; Notice of Allowance for U.S. Appl. No. 12/647,249, filed Dec. 24, 2009, dated Oct. 18, 2010.
Bennett; Notice of Allowance for U.S. Appl. No. 12/701,260, filed Feb. 5, 2010, dated Oct. 12, 2010.
Bennett; Notice of Allowance for U.S. Appl. No. 12/722,787, filed Mar. 12, 2010, dated Nov. 8, 2010.
Bennett; Notice of Allowance for U.S. Appl. No. 12/987,125, filed Jan. 9, 2011, dated Nov. 15, 2011.
Bennett; Supplemental Non-Final Office Action for U.S. Appl. No. 11/029,293, filed Jan. 4, 2005, dated Jun. 12, 2008.
Bennett; U.S. Patent Application entitled: Panel for Sheathing System and Method, filed Dec. 24, 2009 under U.S. Appl. No. 12/647,249.
Bennett; U.S. Patent Application entitled: Panel for Sheathing System and Method, filed Jan. 4, 2005 under U.S. Appl. No. 11/029,535.
Bennett; U.S. Patent Application entitled: Panel for Sheathing System and Method, filed Jan. 9, 2011 under U.S. Appl. No. 12/987,125.
Bennett; U.S. Patent Application entitled: Panelized Roofing System and Method, filed Jan. 4, 2005 under U.S. Appl. No. 11/029,293.
Bennett; U.S. Patent Application entitled: Panelized Roofing System and Method, filed Mar. 12, 2010 under U.S. Appl. No. 12/722,787.
Bennett; U.S. Patent Application entitled: Wall Sheathing System and Method of Installation, filed Feb. 5, 2010 under U.S. Appl. No. 12/701,260.
Bennett; U.S. Patent Application entitled: Wall Sheathing System and Method of Installation, filed Jan. 4, 2005 under U.S. Appl. No. 11/029,300.
Boston Globe; Matt Carroll; "Luxury by Design, Quality by Chance: Wall Sheathing Creates Headaches for Builder, Homeowners"; May 1, 2001.
Building 46.1, High performance walls (IDEAS Challenge), Copyright Crailer Communications, Feb./Mar. 1996.
Building Science Press; Building Science Digest 105; Joseph Lstiburek; "Understanding Drainage Planes"; Oct. 24, 2006.
Clemson University; Holding on to Your Roof; Nov. 2001.
CoFair Products, Inc., Tite-Seal™ Self-Adhesive Waterproof Flashing Flyer.
Dryvit Systems, Inc., DS224, Infinity® System: A Patented Pressure-Equalized Rainscreen Exterior Insulation and Finish System That Incorporates Continuous Insulation and an Air/Water-Resistive Barrier, 1997.
Dryvit Systems, Inc., DS224, The Infinity® Wall System: The pressure equalized rainscreen engineered to prevent water infiltration, 1997.
Energy Source Builder, Wall Sheathing Seam Tape, Oikos, Energy Source Builder #39, Jun. 1994, Iris Communications, Inc.
Energy Vanguard Blog; Allison Bailes; "6 Materials that Drain the Rain on the Plane and Keep a House Dry"; Jan. 27, 2014.
Final Office Action dated Mar. 2, 2009, U.S. Appl. No. 11/029,293, filed Jan. 4, 2005, Title: "Panelized Roofing System and Method," First Named Inventor: John L. Bennett.
Final Office Action dated Mar. 2, 2009, U.S. Appl. No. 11/029,300, filed Jan. 4, 2005, Title: "Wall Sheathing System and Method of Installation," First Named Inventor: John L. Bennett.
Huber Engineered Woods tri-fold pamphlets with product overview including Perform MAX™ (Huber Reference HUB 223), first sale date Sep. 21, 2000.
Huber Engineered Woods, Perform MAX™ 500 Product Sheet (Huber Reference HUB 208), first sale date Sep. 21, 2000.
Huber Engineered Woods; Zip System Products Patents; Webpage, http://www.huberwood.com/zipsystem/patents.
ICC Evaluation Service, Inc.; Acceptance Criteria for Foam Plastic Sheathing Panels Used as Weather-Resistive Barriers; Feb. 2003.
ICC Evaluation Service; ICC-ES Evaluation Report ER-3063; Aug. 2013.
ICC Evaluation Service; ICC-ES Legacy Report ER-1439; Jul. 2001.
ICC Public Hearing; Code Change Proposals, RB251-RB270; Sep. 2006.

* cited by examiner

BUILDING PANEL WITH A WEATHER BARRIER

CROSS-REFERENCE TO RELATED APPLICATIONS

This application claims benefit of U.S. Provisional Patent Application Ser. No. 62/272,277, filed Dec. 29, 2015, and U.S. Provisional Patent Application Ser. No. 62/340,673, filed May 24, 2016, both of which are incorporated by reference herein in their entirety.

BACKGROUND

The present invention generally relates to sheathing assemblies, and more specifically, to sheathing assemblies with weather resistant barriers.

Commercial and residential buildings may be constructed by attaching panels, also called sheathing assemblies, to the underlying support frame. The sheathing assemblies are installed on the exterior surfaces of a building's frame, e.g., along the vertical sides and roof. The panels may be, for example, plywood panels or oriented strand board (OSB) panels. The panels are generally aligned side-by-side, with edges of the adjacent panels contacting one another or being in proximity to one another such that the panels form a substantially continuous surface.

The sheathing assemblies may be covered with a layer of a barrier material, sometimes referred to as building wrap or house wrap, that reduces the effects of the outside environment on the panels and building interior. The house wrap serves as a barrier to protect the panels and the building interior from precipitation, moisture accumulation, or wind. The house wrap may be installed over the panels by unrolling the building wrap from a roll and securing the wrap to the panels using a fastener, for example, staples, adhesives, or nails.

As an alternative to applying the barrier material after installing the panels, the barrier material may be applied to the panels during manufacture. Then the assembled panels are installed on the building exterior. These panels are easily installed on a building or roof exterior.

SUMMARY

In one embodiment, a sheathing panel includes a barrier overlay secured to a panel; wherein the sheathing panel is bulk water resistant and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

According to another embodiment, a sheathing panel system includes at least two adjacent panels, each panel having an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other; a barrier overlay secured to the outer surface or the inner surface of each panel; and a means for sealing the longitudinal joint between the two adjacent panels; wherein each panel is bulk water resistant and has at least one of the following properties: a water vapor transmission rate of at least 7.0 grams/m$^2$/24 hours as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

Yet, according to another embodiment, a method of making a sheathing panel includes applying a weather-resistant coating to a paper to form a barrier overlay; and securing the barrier overlay to a panel; wherein the sheathing panel is bulk water resistant and has at least one of the following properties: a water vapor transmission rate of at least 7.0 grams/m$^2$/24 hours as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

Still yet, according to another embodiment, a sheathing panel includes a barrier overlay secured to a panel with a layer of adhesive, the barrier overlay including a paper having a water-resistant coating disposed on a surface of the paper; wherein the sheathing panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

In an embodiment, a sheathing panel includes a barrier overlay secured to a panel, the barrier overlay including a paper having a water-resistant coating disposed on a surface of the paper; and an anti-skid coating disposed on the water-resistant coating; wherein the sheathing panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

In another embodiment, a sheathing panel system includes at least two adjacent panels, each panel having an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other; a barrier overlay secured to the outer surface or the inner surface of each panel with a layer of adhesive, the barrier overlay including a paper having a water-resistant coating disposed on a surface of the paper; and a means for sealing the longitudinal joint between the two adjacent panels; wherein each panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

Yet, in another embodiment, a sheathing panel system includes at least two adjacent panels, each panel having an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other; a barrier overlay secured to the outer surface or the inner surface of each panel with a layer of adhesive, the barrier overlay including a paper having a water-resistant coating disposed on a surface of the paper and an anti-skid coating disposed on the water-resistant coating; and a tape sealing the longitudinal joint between the two adjacent panels, the tape being water resistant, air impermeable, or both; wherein each panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 2A-2D are side views of the barrier overlay of FIGS. 1A and 1B according to various exemplary embodiments, in which:

FIG. 2A is a barrier overlay including a base paper and a water-resistant coating;

FIG. 2B is a barrier overlay including a base paper, a water-resistant coating, and an anti-skid coating;

FIG. 2C is a barrier overlay including a base paper, a first pigment layer, a water-resistant coating, and an anti-skid coating; and FIG. 2D is a barrier layer including a base paper, a first pigment layer, a second pigment layer, a water-resistant coating, and an anti-skid coating;

DETAILED DESCRIPTION

Figure 1A:
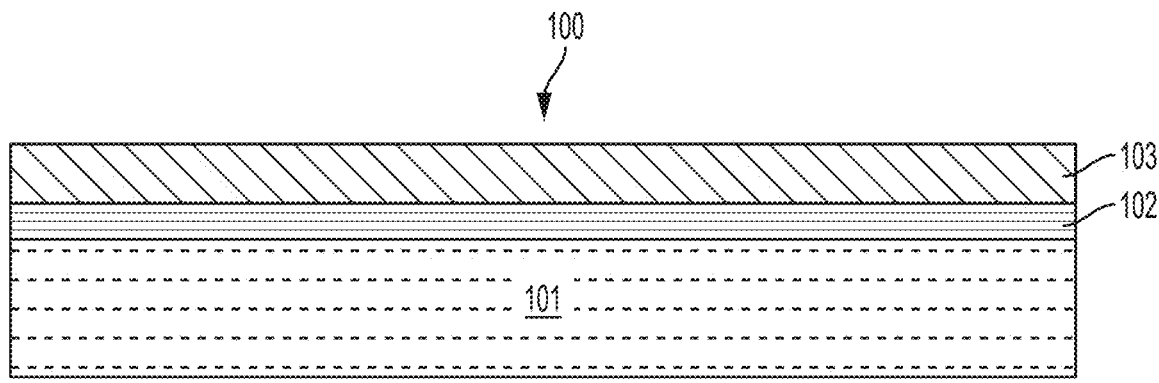
FIG. 1A is a side view of a sheathing panel (assembly) including a barrier overlay attached to a panel with an adhesive according to exemplary embodiments.

Although pre-assembled panels are more easily installed than house wrap on a building site, when barrier material is applied to, for example, OSB at the same time as the strands are pressed to form the OSB panel, or plywood at the same time as the outer ply or plies is/are pressed into the plywood panel, manufacture may be more complex. These manufacturing challenges can decrease product yield.

Another challenge of panel assembly and manufacture relates to means for providing skid-resistance. Sheathing assemblies that combine a weather-resistant barrier and skid-resistant surfaces are desirable when used, for example on a sloped surface such as a roof. However, some methods for providing a skid-resistant surface, such as embossing and texturizing, use plates, screens, or other mechanical devices may wear out over time. With time and use, these devices also may provide different pattern depths, which may change the coefficient of friction and result in difficulties in reproducibility.

Embossing and texturizing a panel surface may also pose challenges for taping because the tapes should seal against air and water. The tape adhesives/backings have to be relatively thick to match or exceed the depth of the embossing/texture to seal out air and water. This can also lead to water ponding at the interface between the tape and panel surface and potential leak paths. The adhesives of the tapes also have to first bridge the gaps and then flow into the recesses, which can take, for example, about 24-72 hours. Further, the tapes have to be applied and then pressure rolled to achieve the correct level of bond.

Therefore, there is a need for an alternative building panel that may be produced in high yield with a pre-assembled barrier material. Further, there is a need for a building panel that provides a reproducible coefficient of friction ($\mu_k$).

Accordingly, various embodiments described herein provide panels, panel systems, and methods of making panels and panel systems in which the barrier material is applied after the panel is formed (e.g., after the OSB is pressed). Such methods and products provide advantages. For example, different panel sizes may be used, and panels are produced in high yield.

Another advantage of the panel/overlay descried herein is that it is substantially smooth, which provides a favorable surface to bond without worry or need to use a pressure roller to properly seat the tape. This allows the tape to immediately seal against air and water. The tape used in the disclosed system is substantially thinner in profile than those tapes commonly used to tape an embossed surface which reduces the chance of water ponding at the intersections and less leaking.

Other embodiments described herein include panels, panel systems, and methods of making panels and panel systems using an anti-skid coating, instead of embossing, that provides a reproducible dry coefficient of friction (p) of at least 0.6.

In some embodiments, corner sealing tapes described herein are used to seal the corner/joint between two adjacent panels. The tape includes a "living hinge" arranged substantially about the center of the width profile, which allows the tape to be easily folded onto an outside corner or an inside corner of a corner structure formed between two adjacent panels, or any subsequent acute or obtuse angle formed by the intersection of two panel planes. Such corner tapes are flexible, yet strong, and can be wound into a roll form and cut to a desired length. In contrast to other conventional tapes used for sealing corners between panels that are difficult to correctly apply and can result in air gaps (bridges or bubbles), the disclosed tapes can be easily installed correctly onto any inside or outside corner, at perpendicular, acute or obtuse angles, to provide a durable air tight seal.

As used herein, the term "about" when modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

Turning now to the Figures, FIG. 1A is a side view of a sheathing assembly 100 (sheathing panel) including a barrier overlay 103 attached to a panel 101 with an adhesive 102 according to exemplary embodiments. The panel 101 is a substrate that includes one or more materials or fibers. Non-limiting examples of suitable materials for the panel 101 include foam, glass, carbon, lignocellulose (also termed lignocellulosic materials), polymers (e.g., polyolefins (such as polypropylene and polyethylene) and polystyrenes), gypsum, metals, cement, or any combination thereof. The panel 101 may be a lignocellulose composite panel including engineered wood products. Engineered wood products include a plurality of substrates composed of wood and/or lignocellulose materials and one or more adhesives to bind, couple, bond, affix, or otherwise join the plurality of materials to one another to form the engineered wood product. Non-limiting illustrative examples of engineered wood products include particleboard, fiberboard (e.g., medium density fiberboard (MDF) and high density fiberboard (HDF)), wafer board, oriented strand board (OSB), plywood, laminated veneer lumber (LVL), laminated veneer boards (LVB), engineered wood flooring, and the like. The panel 101 may include one or more layers.

The permeability of the panels 101 can be adjusted by methods known to one of ordinary skill in the art to provide the permeability desired for a particular application. In an exemplary embodiment, the panel 101 includes expanded polystyrene (EPS) foam, and the permeability of the EPS foam is tailored to provide the desired permeability, and therefore desired water vapor transmission rate and water vapor permeability. EPS foam products can be obtained from, for example, Atlas EPS (Byron Center, Mich.), ACH Foam Technologies (Westminster, Colo.), Insulfoam (Puyallup, Wash.), Universal Foam Products (Hunt Valley, Md.), ThermaFoam LLC (Hillsboro, Tex.), or Insulation Corporation of America (Allentown, Pa.).

The panel 101 is "semi-permeable." As used herein, the term "semi-permeable" means that moisture travels bi-directionally and at substantially the same rate through a surface. A semi-permeable surface or layer has a substantially homogenous water vapor transmission rate and water vapor permeance. A semi-permeable surface has a water vapor permeance in a range from about 1.0 to about 10.0 perms as determined by ASTM E96-15 procedure A at 73° F. and 50% RH. Although at some RH levels that are higher than 50%, the panels 101 may have a water vapor permeance higher than 10.0 perms. In some embodiments, the panel 101 has a water vapor permeance of at least 1.3 perms as determined by ASTM E96-15 procedure A at 73° F. and 50% RH. In other embodiments, the panel 101 has a water vapor permeance about or in any range from about 1.0, 1.3, 1.5, 1.7, 2.0, 2.5, 3.0, 3.5, 4.0, 4.5, 5.0, 5.5, 6.0, 6.5, 7.0, 7.5, 8.0, 8.5, 9.0, 9.5, and 10.0 perms as determined by ASTM E96-15 procedure A at 73° F. and 50% RH.

In some embodiments, the panels 101 include discrete layers of different materials. In one example, the panels 101 may include one or more layers of foam and lignocellulose. Each of these discrete layers and the resulting panel 101 is semi-permeable. When more than one layer is included in the panel, each layer is also semi-permeable.

Any suitable adhesive may be used to bind the materials forming the panel 101. The adhesive may be any glue, binder, or resin that can be mixed, blended, or otherwise contacted with the panel-forming materials and at least partially cured to provide the panel 101. Non-limiting examples of suitable adhesives for forming the panel 101 include isocyanate resins; aldehyde-based resins, such as urea-formaldehyde resins, phenol-formaldehyde resins, melamine-formaldehyde resins, phenol-urea-formaldehyde resins, resorcinol-formaldehyde resins, phenol-resorcinol-formaldehyde resins, and melamine-urea-formaldehyde resins; oxidative binder compositions that are formed by contacting one or more free radical precursors with the lignocellulose substrates and optionally one or more polyphenolic compounds; or any mixture thereof.

Engineered wood panels 101 can be obtained from, for example, Georgia-Pacific (Atlanta, Ga.), Louisiana-Pacific (Nashville, Tenn.), Weyerhaeuser (Seattle, Wash.), Norbord Inc. (Toronto, Canada), Boise Cascade (Boise, Id.), Roseburg Forest Products (Springfield, Oreg.), or Arauco (Santiago, Chile).

At least one or more barrier overlays 103 are combined with the panel 101. The barrier overlay 103 is described in further detail according to various embodiments below. The barrier overlay 103 may be attached to one or both sides of the panel 101. When the panel 101 is a substrate having a one side that is smoother to the touch than the other, for example, an OSB panel, the barrier overlay 103 is applied to the smoother side. One or more panels 101 may be combined with the barrier overlay 103.

An adhesive 102 is disposed on the panel 101, and the barrier overlay 103 is disposed on the adhesive 102, or vice versa. The adhesive 102 binds the barrier overlay 103 to the panel 101 (see FIGS. 3A and 3B).

The layer of adhesive 102 has a water vapor permeance of at least 1.0 perm. The adhesive 102 may or may not be water soluble. The adhesive 102 may be any adhesive material that is compatible with the panel 101 material and the barrier overlay 103 material. In one embodiment, the panel 101 includes lignocellulose and the barrier overlay 103 includes paper, and the adhesive 102 is compatible with lignocellulose and paper.

Non-limiting examples of suitable adhesives 102 include isocyanate resins (e.g., methylene diphenyl diisocyanate (MDI)); diethylene divinyl acetate resins; ethylene vinyl acetate resins; polyvinyl alcohol resins; aldehyde-based resins, such as urea-formaldehyde resins, phenol-formaldehyde resins, melamine-formaldehyde resins, phenol-urea-formaldehyde resins, resorcinol-formaldehyde resins, phenol-resorcinol-formaldehyde resins, and melamine-urea-formaldehyde resins; oxidative binder compositions that are formed by contacting one or more free radical precursors with a lignocellulose substrate and optionally one or more polyphenolic compounds; or any mixture thereof. In one embodiment, the adhesive 102 is an ethylene vinyl acetate (EVA) emulsion. In another embodiment, the adhesive 102 is a cross-linking adhesive. In an exemplary embodiment, the adhesive 102 is a mixture or copolymer of methylene diphenyl diisocyanate (MDI) and ethylene vinyl acetate (EVA).

The adhesive 102 is applied to the surface of the panel 101 or the barrier overlay 103 by a suitable method. The adhesive 102 is applied as a continuous, partially continuous, or substantially continuous layer on the surface of the panel 101 or the barrier overlay 103. In one example, the adhesive 102 may be sprayed or extruded onto the surface of the panel 101.

The adhesive 102 is applied in an amount to provide sufficiently continuous coverage of the panel 101 or the barrier overlay 103. The amount of the adhesive 102 may generally vary. In embodiments, the adhesive 102 is applied in an amount of at least 4 grams per square feet ($g/ft^2$).

When an adhesive 102 is used, the adhesive 102 has a water vapor transmission rate and water vapor permeance greater than or equal to the panel 101.

Figure 1B:
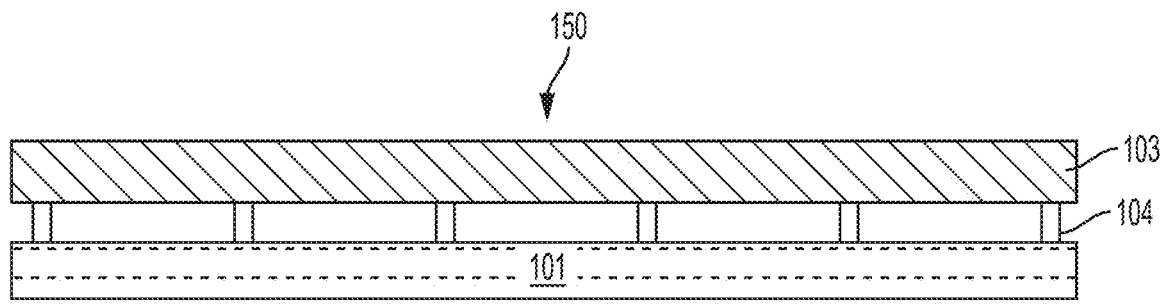
FIG. 1B is a side view of a sheathing panel including a barrier overlay attached to a panel without an adhesive according to exemplary embodiments.

In an alternative embodiment, the barrier overlay 103 may be attached/secured to the panel 101 without an adhesive 102 by any suitable method. FIG. 1B is a side view of a sheathing assembly 150 including a barrier overlay 103 attached to a panel 101 without an adhesive according to exemplary embodiments. For example, the barrier overlay 103 may be joined, fastened, secured, contacted, affixed, or connected to the panel 101 by using one or more suitable fastening devices 104 or methodologies. Non-limiting examples of suitable fastening devices 104 include staples, nails, screws, rivets, clamps, and the like. Non-limiting methodologies include heat or pressure.

The barrier overlay 103 provides the sheathing panel 100 with an air, water, moisture, light, precipitation, wind, and general environmental barrier. The barrier overlay 103 is water-resistant yet allows water vapor to permeate, as described below. When the adhesive 102 is used to bind the barrier overlay 103 to the panel, the adhesive 102 does not substantially interfere with the above-described properties.

FIGS. 2A-2D are side views of the barrier overlay 103 of FIGS. 1A and 1B according to embodiments. The barrier overlays 103 described in FIGS. 2A-2D are semi-permeable. Moisture travels bi-directionally and at substantially the same rate throughout the barrier overlays 103. The barrier overlays 103 have a substantially homogenous water vapor transmission rate and water vapor permeance. The barrier overlays 103 has a water vapor permeance in a range from about 1.0 to about 10.0 perms as determined by ASTM E96-15 procedure A at 73° F. and 50% RH. In some embodiments, the barrier overlay has a water vapor permeance of at least 1.3 perms as determined by ASTM E96-15 procedure A at 73° F. and 50% RH. In other embodiments, the barrier overlay 103 has a water vapor permeance about or in any range from about 1.0, 1.3, 1.5, 1.7, 2.0, 2.5, 3.0, 3.5, 4.0, 4.5, 5.0, 5.5, 6.0, 6.5, 7.0, 7.5, 8.0, 8.5, 9.0, 9.5, and 10.0 perms as determined by ASTM E96-15 procedure A at 73° F. and 50% RH.

Figure 2A:
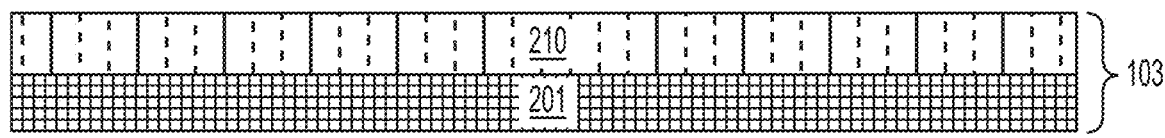

FIG. 2A is a barrier overlay 103 including a base paper 201 and a water-resistant layer (coating or film) 210 arranged on the base paper 201. The base paper 201 is a paper substrate including lignocellulosic fibers or cellulosic fibers. The base paper 201 may be a kraft paper. Non-limiting examples of suitable cellulosic fibers include any fibers incorporating cellulose as a constituent. The cellulosic fibers may be secondary, recycled fibers. The cellulosic fibers may be hardwood fibers, such as hardwood kraft fibers, hardwood sulfite fibers, softwood fibers, such as softwood kraft fibers, softwood sulfite fibers, or any combination thereof. In an embodiment, the base paper 201 is a thin paper, or a supercalendered paper. The base paper 201 may be any color(s).

In some embodiments, suitable paperboard material that can be used for the base paper 201 is cupstock or paperstock, and the water-resistant layer 210 is a polymeric film that is extruded onto the surface of the base paper 201. The polymeric film can include one or more additives or pigments. Cupstock includes, for example, solid bleached sulfate ("SBS") from Georgia-Pacific (Atlanta, Ga.).

In one embodiment, the base paper 201 has a basis weight in a range from about 20 grams per square meter (gsm) to about 350 gsm, or from about 20 pounds (lb)/3000 square foot ($ft^2$) to about 100 lb/1000 $ft^2$. In another embodiment, the base paper 201 has a basis weight in a range from about 20 gsm to about 60 gsm.

The base paper 201 directly contacts the adhesive 102 as shown in FIG. 1. However, the adhesive 102 is applied in such a manner that that it does not substantially impregnate (or substantially penetrate) the base paper 201. The adhesive 102 remains on a top surface of the base paper 201.

The water-resistant layer 210 provides the base paper 201 with a weather-resistant barrier. The water-resistant layer 210 is any air, water, moisture, light, precipitation, wind, and/or general environmental barrier. The water-resistant layer 210 provides a water-resistant and bulk water-repellant barrier that is also substantially permeable to water vapor (allows water vapor to pass through).

The water-resistant layer 210 is applied to the base paper 201 to substantially cover the surface of the base paper 201. Like the adhesive 102, the water-resistant layer 210 does not substantially impregnate or substantially penetrate the base paper 201. Impregnation or penetration of the water-resistant layer 210 into the base paper 201 would make the base paper 201 brittle and prone to cracking. The water-resistant layer 210 is chosen such that it remains disposed on the top surface of the base paper 201.

In an embodiment, the water-resistant layer 210 is a melamine coating. However, the water-resistant layer 210 is not limited and may include one or more polymers and/or synthetic materials provided that the water-resistant coating is bulk water resistant and water vapor permeable.

The water-resistant layer 210 may cure as a substantially colorless layer. In another embodiment, the water-resistant layer 210 is an acrylic coating. The types of materials used for the water-resistant layer 210 is not intended to be limited and may generally vary depending on the type of surface properties desired for the sheathing panel 100.

Figure 2B:
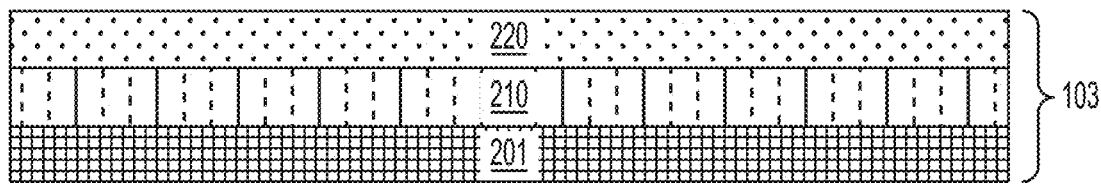

FIG. 2B is a barrier overlay 103 including a base paper 201, a water-resistant layer 210 arranged on the base paper 201, and an anti-skid coating 220 arranged on the water-resistant coating 210. The anti-skid coating 220 may be applied when the panels need additional skid-resistance, for example, when used on roofs or on vertical sides to prevent ladder slippage.

The anti-skid coating 220 is applied over the water-resistant coating 210. The anti-skid coating 220 may or may not cover the entire surface of the water-resistant layer 210. The anti-skid coating 220 is generally not physically observable by the naked eye. Because the anti-skid coating 220 cannot be seen with the naked eye, a panel having the coating feels smooth to the touch. However, the anti-skid coating 220 may be seen using an electron microscope or atomic force microscope (AFM). Embodiments provide a weather-resistant barrier with desirable skid-resistance that can be made on conventional rotogravure machinery. The anti-skid coating 220 is substantially invisible as it also cannot be felt with one's hand because it is free of any protrusions, indentations, suppressions, or impressions. The anti-skid coating 220 provides a skid-resistant surface that is substantially smooth, yet provides an increased coefficient of friction.

The anti-skid coating 220 provides the barrier overlay 103 with a dry coefficient of friction ($\mu_k$) of at least 0.6. The dry coefficient of friction is measured according to American Society for Testing and Materials International (ASTM International) standard F1679-04.

For comparison, the barrier overlay 103 without the anti-skid coating 220 (the water-resistant layer 210 over the base paper 201) may have a dry coefficient of friction of about 0.52 to 0.58. When the panel 101 is an OSB, the "screen-side" (or rougher side) of the panel 101 may have a dry coefficient of friction of about 0.75 to 0.85. Other commercially available barrier overlays that utilize embossing or texturizing processes to provide a skid-resistant surface have a dry coefficient of friction of about 0.63 to 0.69. Accordingly, embodiments of the anti-skid coating 220 provide an increased coefficient of friction without embossing, texturizing, or other like processes. The anti-skid coating 220 is substantially free of embossing and texture, as seen by the naked eye.

In some embodiments, the barrier overlay 103 with the anti-skid coating 220 has a dry coefficient of friction is in a range from about 0.6 to about 1.0. In other embodiments, the barrier overlay 103 with the anti-skid coating 220 has dry coefficient of friction is in a range from about 0.65 to about 0.75. Yet, in other embodiments, the anti-skid coating 220 increases the dry coefficient of friction by at least 0.1, or about 0.1 to about 0.4.

The anti-skid coating 220 is formed by applying a coating in any desired pattern. The anti-skid coating 220 may be an ink formulation. The anti-skid coating 220 may include any polymer, dye, pigment, or ink formulation. The anti-skid coating 220 may include a urethane material.

The anti-skid coating 220 may be any geometric pattern or design. The anti-skid coating 220 may also include a non-repeating design. The anti-skid coating 220 may be disposed onto the base paper 201, over the water-resistant coating 210, in any suitable design or array to provide skid-resistance properties and desired dry coefficients of friction.

The anti-skid coating 220 may be applied to the base paper 201 over the water-resistant layer 210 in an amount that may generally vary depending on the formulation of the anti-skid coating 220, the pattern or design, and the desired coefficient of friction. In some embodiments, the anti-skid coating 220 may cover, for example, about 1 to about 10% of the base paper 201 surface area. In other embodiments, the anti-skid coating 220 covers from about 2 to about 25% of the base paper 201 surface area. In some embodiments, the anti-skid coating 220 covers from about 25 to about 100% of the base paper 201 surface area. In other embodiments, the anti-skid coating 220 covers from about 1 to about 100% of the base paper 201 surface area.

When the anti-skid coating 220 is formed from a repeating pattern, the dimensions of the repeating unit may generally vary. In some embodiments, the repeating unit is about 0.01 to about 1 square inches ($inch^2$). In other embodiments, the repeating unit is about 0.05 to about 0.5 $inch^2$. Yet, in other embodiments, the repeating unit is about 0.07 to about 0.2 $inch^2$. Still yet, in other embodiments, the repeating unit is any repeating geometric shape or combination of geometric shapes, letters, numbers, or designs.

Figure 6A:
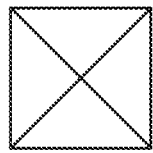
FIGS. 6A and 6B illustrate an exemplary anti-skid coating pattern.
Figure 6B:
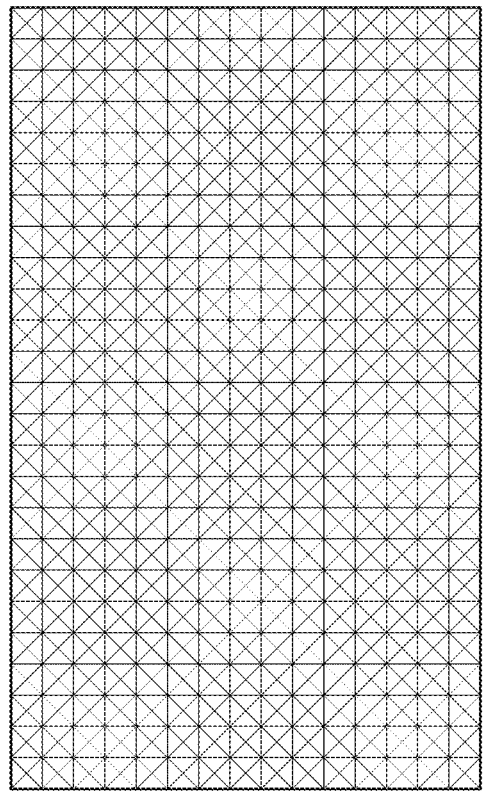

FIGS. 6A and 6B illustrate an anti-skid coating 220 pattern according to an exemplary embodiment. The coating that forms the anti-skid coating 220 is applied in a geometric pattern shown in FIG. 6A as a single unit. The pattern is repeated, as shown in FIG. 6B, across the base paper 201 to form the anti-skid coating 220.

Figure 7A:
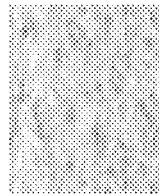
FIGS. 7A and 7B illustrate an exemplary anti-skid coating pattern.
Figure 7B:
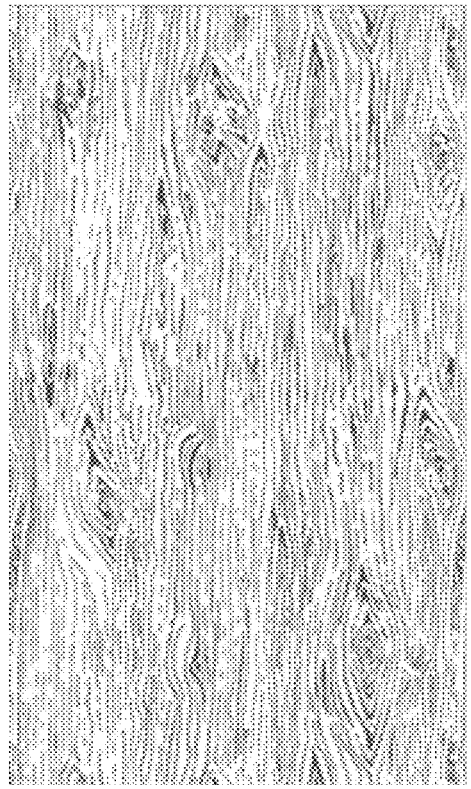

FIGS. 7A and 7B illustrate another exemplary anti-skid coating 220 pattern according to an embodiment. The coating that forms the anti-skid coating 220 is applied in the natural wood design shown in FIG. 7A as a small scale. The design is repeated, as shown in FIG. 7B, across the base paper 201 to form the anti-skid coating 220.

The anti-skid coating 220 may be incorporated, applied, coated, or printed onto the base paper 201 by any methods known in the art. In some embodiments, the anti-skid coating 220 is formed by printing the coating formulation onto the base paper 201. Printing may be performed, for example, using a rotogravure machine.

Figure 5:
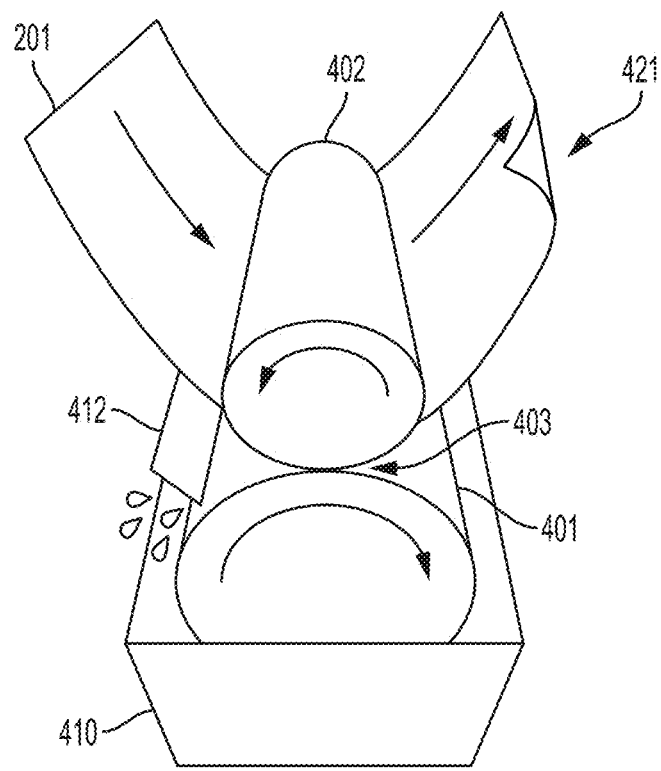
FIG. 5 is a diagram of a rotogravure machine assembly for forming an anti-skid coating pattern on the barrier overlay.

FIG. 5 is a schematic diagram of a rotogravure machine assembly for forming the anti-skid coating 220 on the water resistant layer 210 disposed on the base paper 201 of the barrier overlay 103 according to embodiments. An engraved cylinder 401 (also known as "gravure cylinder") includes the design/image/pattern to be transferred to the base paper 201. The circumference of the engraved cylinder 401 varies according to the layout of the design/pattern being printed. The engraved cylinder 401 may be made of a metal, for example, steel, copper, or other materials. The desired pattern is achieved by engraving with a laser or a diamond tool, or by chemical etching. The pattern on the engraved cylinder 401 includes recessed cells that will hold ink that is then transferred to the base paper 201. The base paper 201 includes at least the water-resistant layer 210 disposed thereon (not shown). The anti-skid coating 220 will be disposed on or in the water-resistant layer 210. The base paper 201 may also include one or more additional layers, as described below in other embodiments. The engraved cylinder 401 is partially immersed in the ink tray 410, which fills the recessed cells. The base paper 201 is fed between the engraved cylinder 401 and an impression roll 402 into a nip 403. As the engraved cylinder 401 rotates, it draws excess ink onto its surface and into the cells. Acting as a blade to remove excess ink, the doctor blade 412 scrapes the engraved cylinder 401 before it makes contact with the base paper 201. The doctor blade 312 removes the excess ink from the non-printing (non-recessed) areas.

The base paper 201 is sandwiched between the impression roll 402 and the engraved cylinder 401 in the nip 403 where the ink is transferred from the recessed cells of the engraved cylinder 401 to the base paper 201. The impression roll 402 applies sufficient force to ensure the base paper 201 is brought into contact with the engraved cylinder 401. Once in contact with the base paper 201, the ink's surface tension pulls the ink out of the cell and transfers it to the base paper 201. After emerging from the nip 403, the printed side 421 of the base paper 201 faces the engraved cylinder 401. The printed side 421 of the base paper 201 is dried. Optionally, one or more anti-skid coating 220 layers may be applied to the base paper 201.

As mentioned above, the barrier overlay 103 may include one or more additional layers in addition to the water-resistant layer 210 and the anti-skid coating 220. The additional layers or coatings may be, for example, anti-ultraviolet (UV) coatings, anti-infrared (IR) coatings, anti-reflective coatings, anti-microbial coatings, anti-oxidant coatings, pigment/ink layers, or other like coatings. Any additional layers or coatings may be used, provided that the coatings or layers do not interfere with the properties of the resulting panel or system. One or more additives may also be incorporated into the water-resistant coating 210.

Figure 2C:
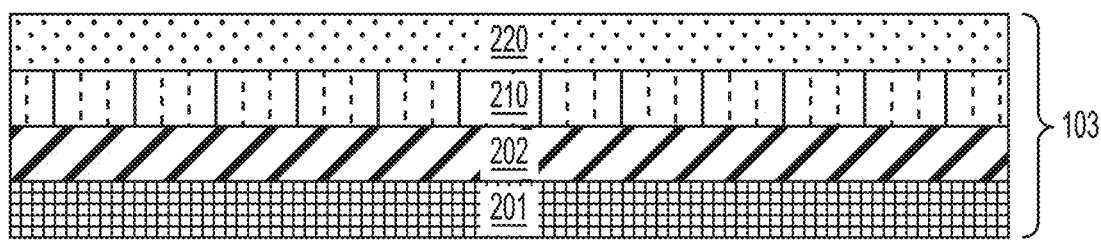

FIG. 2C is a barrier overlay 103 including a base paper 201, a first pigment layer 202, a water-resistant coating 210, and optionally, an anti-skid coating 220 according to an embodiment. In some embodiments, the barrier overlay 103 does not include the anti-skid coating 220.

The first pigment layer 202 is disposed on the surface of the base paper 201 before applying the water-resistant coating 210. The first pigment layer 202 may be an ink or pigment of any color or colors. The first pigment layer 202 may substantially cover the surface of the base paper 201 as a solid layer as shown in FIG. 2C, or the pigment layer 202 may partially cover the surface of the base paper 201 (not shown). The first pigment layer 202 may be any desired color. In an example, the starting base paper 201 is white, and the first pigment layer 202 includes a gray pigment. Non-limiting examples of suitable inks or pigments for the first pigment layer 202 include organic dyes.

Figure 2D:
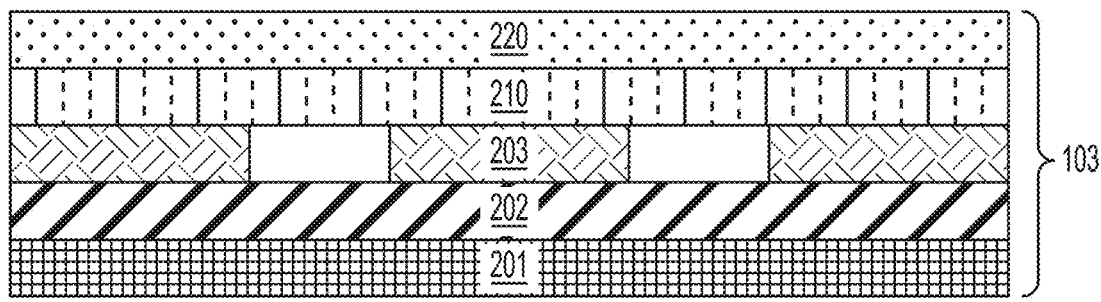

FIG. 2D is a barrier layer including a base paper 201, a first pigment layer 202, a second pigment layer 203, a water-resistant coating 210, and optionally, an anti-skid coating 220. In some embodiments, the barrier overlay 103 does not include the anti-skid coating 220.

The second pigment layer 203 may partially cover the surface of the base paper 201, or the second pigment layer 203 may substantially cover the surface of the base paper 201 as a solid layer (not shown). The pattern shown in FIG. 2D is but an exemplary representation of the second pigment layer 203 being disposed over a portion of the base paper 201. The second pigment layer 203 may be applied to the base paper 201 in any design or pattern and in any amount desired. For example, the second pigment layer 203 may be applied in a design, logo, image, or pattern. When applied over the first pigment layer 202, the first pigment layer 202 provides a background color.

The second pigment layer 203 may be an ink or pigment of any color or colors. Non-limiting examples of suitable inks or pigments for the second pigment layer 203 include organic dyes.

The embodiments shown for the barrier overlay 103 in FIGS. 2A-2D are exemplary embodiments. The barrier overlay 103 may include any additional coatings or layers between any of the coatings and layers shown in FIGS. 2A-2D. The anti-skid coating 220 shown in some embodiments is optional.

After securing the barrier overlay 103 to the panel 101, the resulting sheathing panel 100 has at least the following properties. The sheathing panel 100 is bulk water resistant, water vapor semi-permeable, and air impermeable.

As used herein, the term "bulk water resistant" means passing (no visible water penetration) after 15 minutes of testing at 2.5 pounds per square foot (psf) per the ASTM E331-00(2016) standard.

Air permeability is measured according to ASTM International test method ASTM E2357-11 (Standard Test Method for Determining Air Leakage of Air Barrier Assemblies). The sheathing panel 100 is substantially air impermeable, having an air infiltration rate of less than 0.2 liters per second per square meter (L/s-m$^2$) at 75 pascals (Pa), as measured by ASTM E2357-11.

Water vapor transmission rate is measured according to ASTM E96-15 procedure A (at 73° F. and 50% relative humidity (RH)) (Standard Test Methods for Water Vapor Transmission of Materials). The sheathing panel 100 has a water vapor transmission rate (WVTR) of at least 7.0 grams/m$^2$/24 hours as determined by ASTM E96-15 procedure A (at 73° F. and 50% relative humidity (RH)). In some embodiments, the sheathing panel 100 has a WVTR in a range from about 7.0 to about 60.0 grams/m$^2$/24 hours. In other embodiments, the sheathing assembly 100 has a WVTR in a range from about 7.5 to about 500 grams/m$^2$/24 hours.

The sheathing panel 100 has a water vapor permeance of at least 1.3 perms as determined by ASTM E96-15 procedure A at 73° F. and 50% RH. In some embodiments, the sheathing panel 100 has a water vapor permeance in a range from about 1.5 to about 25.0 perms. In other embodiments, the sheathing panel 100 has a water vapor permeance in a range from about 1.5 to about 50 perms. In other embodiments, the sheathing panel 100 has a water vapor permeance about or in any range from about 1.3, 1.4, 1.5, 1.6, 1.7, 1.8, 1.9, 2.0, 5.0, 10.0, 15.0, 20.0, 25.0, 30.0, 35.0, 40.0, 45.0, and 50.0 perms as determined by ASTM E96-15 procedure A at 73° F. and 50% RH.

The sheathing panel 100, like the individual layers, is at least semi-permeable. Moisture travels bi-directionally and at substantially the same rate throughout the sheathing panel 100. The sheathing panel 100 has a substantially homogenous water vapor transmission rate and water vapor permeance.

Figure 3A:
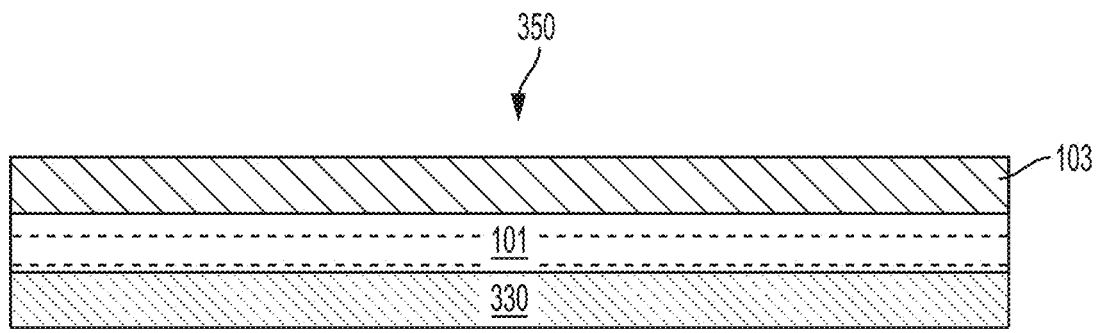
FIG. 3A is a sheathing panel with a barrier overlay attached to a panel and one or more additional panels.

FIG. 3A is a sheathing panel 350 with a barrier overlay 103 attached to a panel 101 (first panel) and one or more additional panel. The second panel 330 can provide additional benefits, such as enabling adherence to more stringent energy codes, for example, the 2015 International Energy Conservation Codes (IECC). The second panel 330 can include one or more layers. The second panel 330 can be the same or different than the panel 101. The second panel 330 is semi-permeable.

The second panel 330 is a substrate that includes one or more materials or fibers. Non-limiting examples of suitable materials for the second panel 330 include foam, glass, carbon, lignocellulose (also termed lignocellulosic materials), polymers (e.g., polyolefins (such as polypropylene and polyethylene) and polystyrenes), gypsum, metals, cement, or geopolymers, or any combination thereof. The second panel 330 may be a lignocellulose composite panel including engineered wood products. Engineered wood products include a plurality of substrates composed of wood and/or lignocellulose materials and one or more adhesives to bind, couple, bond, affix, or otherwise join the plurality of materials to one another to form the engineered wood product. Non-limiting illustrative examples of engineered wood products include particleboard, fiberboard (e.g., medium density fiberboard (MDF) and high density fiberboard (HDF)), wafer board, oriented strand board (OSB), plywood, laminated veneer lumber (LVL), laminated veneer boards (LVB), engineered wood flooring, and the like. The second panel 330 may include a radiant barrier layer. When a radiant barrier layer is included in second panel 330, the radiant barrier layer is the outermost layer, opposing the barrier overlay 103.

In an exemplary embodiment, panel 101 includes lignocellulose (e.g., plywood or OSB), and second panel 330 includes foam. In another exemplary embodiment, panel 101 includes foam, and second panel 330 includes lignocellulose. Yet, in other embodiments, panel 101 includes two layers, a foam layer in contact with the barrier overlay 103 and a lignocellulose layer, and second panel 330 includes foam.

Figure 3B:
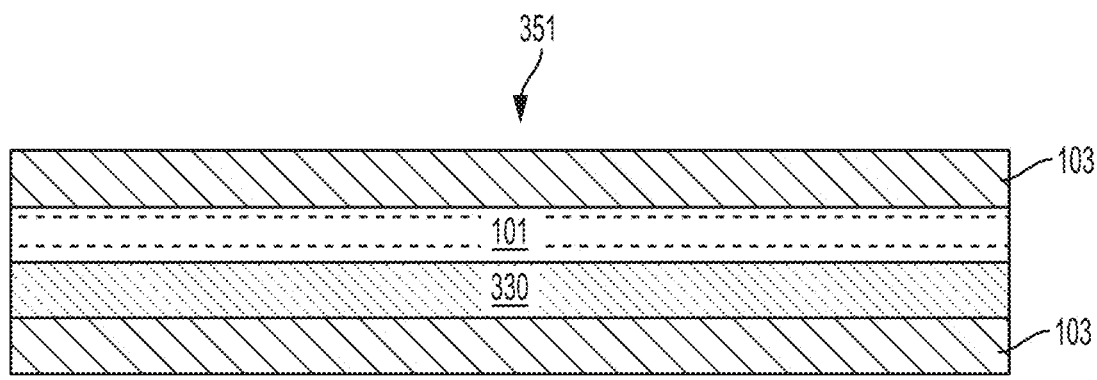
FIG. 3B is a sheathing panel with a barrier overlay attached to a panel, one or more additional panels, and another barrier overlay.

FIG. 3B is a sheathing panel 351 with a barrier overlay 103 attached to a panel 101 with one or more additional panels 330 and another barrier overlay 103. The second panel 330 can include one or more layers as described above for FIG. 3A and can be the same or different than the panel 101. The barrier overlays 103 on opposing sides can be the same or different.

Figure 3C:
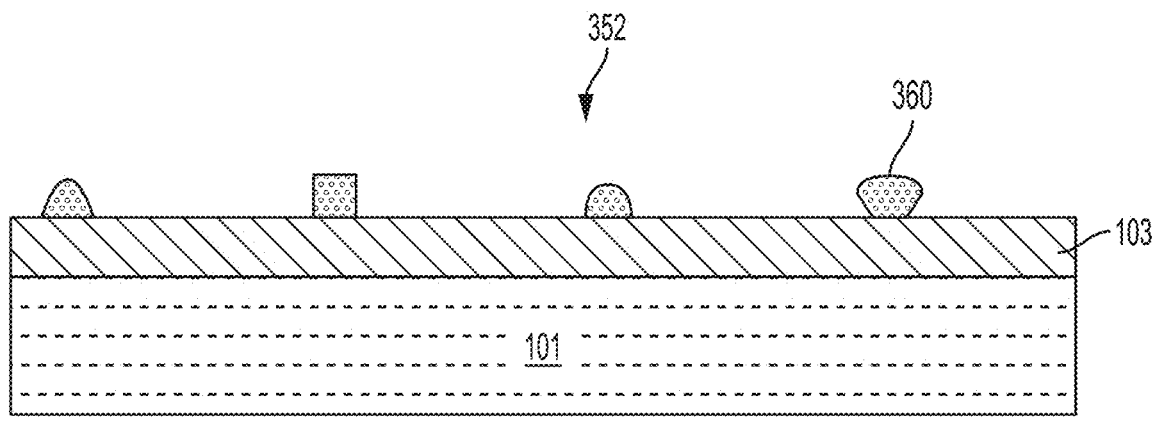
FIG. 3C is a sheathing panel with drainage spacers arranged on the barrier overlay.

FIG. 3C is a sheathing panel 352 with drainage spacers 360 arranged on the barrier overlay 103. The drainage spacers 360 provide improved water drainage and drying from the surface of the sheathing panel 352. The drainage spacers 360 will be arranged between the barrier overlay 103 and the cladding (e.g., brick, siding, etc.). The drainage spacers 360 can have any size, shape, or dimensions, as shown in FIG. 3C. The barrier overlay 103 can include any number of drainage spacers 360.

Figure 4:
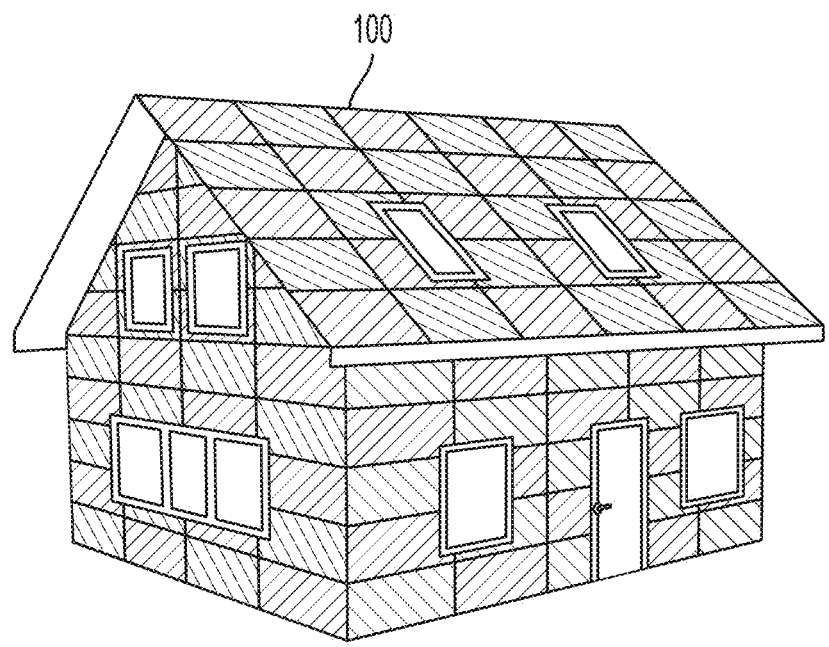
FIG. 4 is a diagram of sheathing panels arranged on a house.

FIG. 4 is a schematic diagram of sheathing panels 100 arranged on a building. To form a sheathing panel system, one or more sheathing panels 100 are disposed onto a frame or other support member to provide a supported sheathing assembly. The frame can be or include, but is not limited to, a wood frame, metal frame, concrete or cement frame, cinder block frame, or any combination thereof. The frame can be configured to provide an enclosed structure such as a house as shown in FIG. 4, garage, trailer, or other residential structure. The frame can be configured to provide an enclosed structure, such as a commercial building, warehouse, storage building, or any other commercial structure. The sheathing panels 100 can be disposed about a portion of the frame or the entire frame to provide an enclosed structure.

The sheathing panels 100 are arranged edge to edge. The panel system includes at least two adjacent panels. Each panel 100 has an outer surface, an inner surface, and at least one edge extending therebetween. Each sheathing panel 100 is aligned with its at least one edge proximate to the at least one edge of the adjacent panel 100 to define a longitudinal joint between the two adjacent panels 100, and wherein the edges of the adjacent panels 100 are substantially parallel to each other.

The sheathing assembly can be disposed about the frame with the barrier overlay 103 oriented towards the outside, i.e., away from the frame. In other words, the sheathing panel 100 of the sheathing assembly can be oriented toward and/or can at least partially contact the frame. The sheathing assembly can provide or otherwise make up a portion of a building structure's wall, roof, and/or floor.

Figure 8:
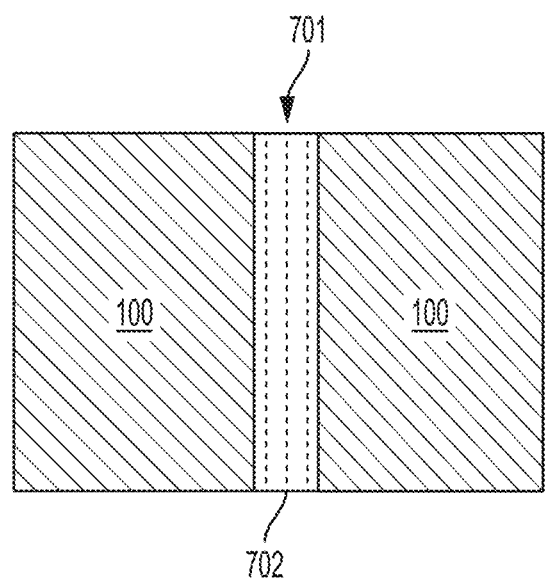
FIG. 8 is a panel system of two panels having a gap arranged therebetween and tape covering the gap.

In one or more embodiments, a plurality of sheathing panels 100 can be disposed on the frame such that each sheathing panel 100 is spaced apart. For example, as shown in FIG. 8, a gap (or longitudinal joint) 701 of at least 1 mm, at least 2 mm, at least 3 mm, at least 4 mm, or at least 5 mm can be provided between adjacent sheathing panels 100. Yet, in other embodiments, the panels 100 are arranged with their edges substantially flush with one another without a gap therebetween.

Because the surface of the panels 100 are substantially flat and smooth without readily-visible ridges and/or valleys, a thin, low-profile tape 702 may be used to seal the gaps between the sheathing panels 100, as shown in FIG. 8. The tape 702 may be a pressure sensitive adhesive tape. A specialized applicator and/or high pressure are not needed to apply the tape 702 because the panels are substantially flat and smooth. The tape 702 is therefore easy to apply. The tape 702 may have ridges along each edge for easy tearing. In one or more embodiments, tape 702 can be disposed along each seam or gap 701 between the one or more sheathing panels 100.

The tape 702 can provide a water and/or air resistant seal. The tape 702 is bulk water resistant, water vapor impermeable due to a backing, and air impermeable. Although, in other embodiments, the tape 702 may be water vapor permeable. In an embodiment, the tape 702 is at least as water vapor impermeable as the sheathing panel 100.

Illustrative tapes 702 can include, but are not limited to, building code compliant tapes, such as those sold by the Pactiv Corporation and/or Georgia-Pacific Wood Products LLC. Other suitable tapes 702 include those that meet the Pressure Sensitive Tape Council test methods PSTC 101 and 131.

Instead of a tape 702, the sheathing panels 100 may be joined by an edge seal or edge coating disposed thereabout. The edge seal/coating can reduce or prevent water and/or air from penetrating into the edges and sides of the sheathing panels 100. The edge seal/coating can include one or more paints, pastes, lacquers, laminates, waxes, gels, glues, epoxies, polymeric materials, resins, expanding foams, or any combination thereof.

Two sheathing panels 100 can be joined together at any suitable angle with respect to one another. Sheathing panels 100 can be joined or positioned with respect to one another at any angle. For example, the panels 100 may be joined end-to-end, or rotated at an angle with respect to one another. In one or more embodiments, the longitudinal joint provided between the sheathing panels 100 can be located at any location about a structure, for example a corner, a roof seam or joint, a floor seam or joint, a wall seam or joint, and the like.

FIGS. 9A, 9B, 9C and 9D illustrate corner sealing polymeric material 800 according to various embodiments. When two sheathing panels 100 (of FIG. 9D) are joined to form a corner or joint, having any angle, the corner sealing polymeric material 800 may be used to seal the joint therebetween. The corner sealing polymeric material 800 is relatively rigid or stiff. The thickness of the polymeric material forming the sides 803 (of FIG. 9A) may generally vary. In some embodiments, the polymeric material has a thickness in a range from about 0.008 inch to about 0.20 inch, or from about 0.010 inch to about 0.012 inch.

The polymeric material may include one or more polymers and/or copolymers. The polymeric material may include, but is not limited to, an acrylic or acrylate polymer, a polyvinyl chloride polymer, a polycarbonate polymer, a polyethylene polymer, a polypropylene polymer, an ethylene propylene diene monomer rubber, a polysulfone polymer, a polyacrylonitrile polymer, a polystyrene polymer, an acrylonitrile butylene styrene polymer, or copolymer thereof.

Figure 9A:
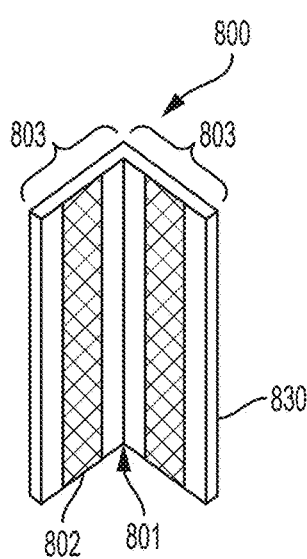
FIGS. 9A, 9B, 9C and 9D are corner sealing tapes.
Figure 9B:
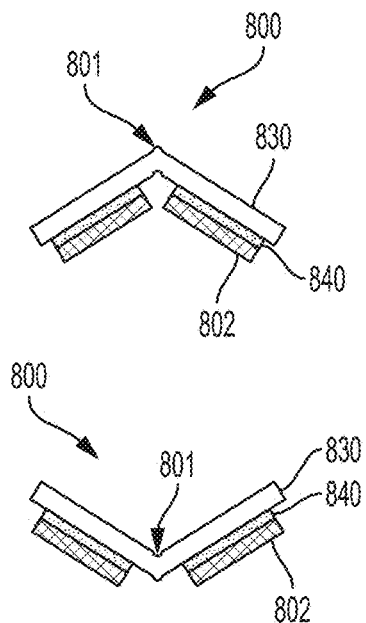

The corner sealing polymeric material 800 includes a "living" hinge 801 that is flexible compared to the sides 803, first side and second side (of FIG. 9A). The hinge 801 extends longitudinally along the length of the corner sealing polymeric material 800. The sides 803 and the hinge 801 may be formed from one or more different materials having different flexibility. The sides 803 should be stiffer (less flexible) than the hinge 801 so that the tape 800 can be bent in two directions (as shown in FIG. 9B) to accommodate either an inside corner 850 or an outside corner 860 (as shown in FIG. 9D). The hinge 801 is more flexible than the sides 803. Because the polymeric material is relatively stiff, the corner sealing polymeric material 800 can be maintained in a bent position, as shown in FIG. 9B. The corner sealing polymeric material 800 also protects the corners between the sheathing panels 100.

To make the corner sealing polymeric material 800, a polymeric material can be extruded with the hinge 801 geometry in place. The hinge 801 may be made of a more flexible or elastic material than the sides 803 of corner sealing polymeric material 800. In one example, the corner sealing polymeric material 800 is formed by co-extruding polymeric material with a differential thickness between hinge 801 and sides 803 of corner sealing polymeric material 800. The hinge 801 also may be co-molded or otherwise co-formed with the rigid polymeric material. Thus, the hinge 801 is thinner and more flexible and elastic than the sides 803 of corner sealing polymeric material 800.

The hinge 801 may also be formed by cutting a slit or groove in the surface of the polymeric material. The slit or groove does not go all the way through the polymeric material.

The corner sealing polymeric material 800 is coated on one surface with adhesive strips 840 (see FIG. 9B) that run substantially parallel to the hinge 801 and extend along the longitudinal length of the corner sealing polymeric material 800. Adhesive strips 840 are arranged on opposing sides of the hinge 801. Alternatively, a single adhesive strip may be arranged across the entire width of the corner sealing polymeric material 800.

Figure 10A:
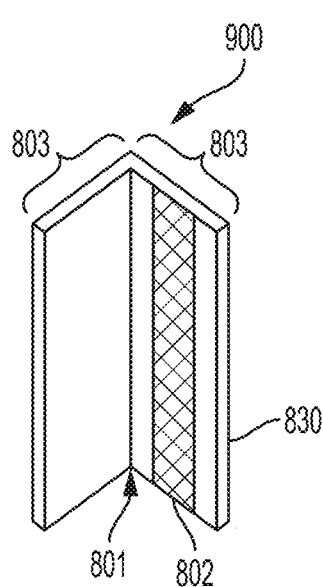
FIGS. 10A, 10B, 10C, and 10D are corner sealing tape used as flange for window and door applications.
Figure 10B:
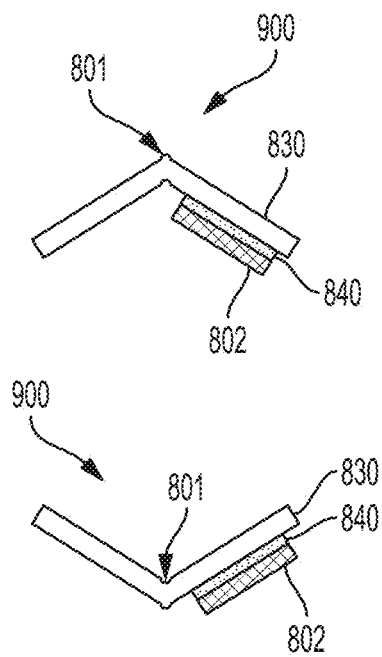

In another embodiment, the corner sealing polymeric material 900 includes a single adhesive strip 840 on one side of the hinge 801, as shown in FIGS. 10A and 10B. A single adhesive strip 840 can be used to create a flange to seal a sheathing panel 100 to a window or door, for example. The other side of the corner sealing polymeric material 900 without the adhesive strip 840 can be adhered to the structure surface and sealed with another strip of another type of tape or a fastener (e.g., a nail or a staple). A protective cover 802 can be arranged on the single adhesive strip.

Figure 10C:
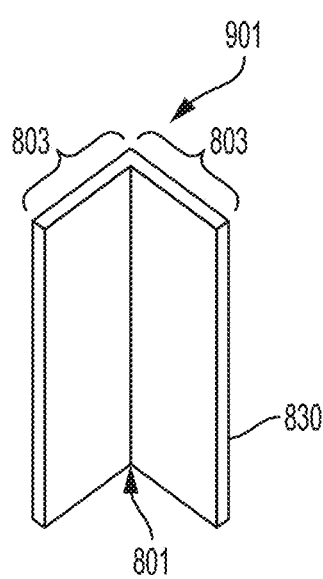
Figure 10D:
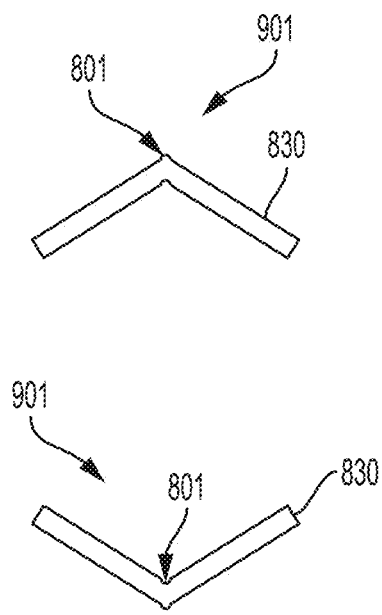

Yet, in another embodiment, the corner sealing polymeric material 901 does not include adhesive strips 840, as shown in FIGS. 10C and 10D, and the corner sealing polymeric material 901 can then be placed in a corner or at an interface between two sheathing panels 100. Another tape or fasteners can be used to seal the corner sealing polymeric material 901 without the adhesive strips 840. Corner sealing polymeric material 901 without adhesive strips 840 can provide rigidity to a structure or corner.

Each adhesive strip 840 includes a pressure sensitive adhesive. Non-limiting examples of suitable adhesives for the adhesive strips 840 include acrylic, latex, block copolymers, butyl, bituminous, and any mixture thereof. The adhesive strips 840 may be continuous or discontinuous, and the amount disposed on the sides 803 of the tape 800 may vary.

Protective covers 802 are arranged over the adhesive strips 840 and also run substantially parallel with the hinge 801 and lateral edges of the corner sealing polymeric material 800. The protective covers 802 cover and protect the adhesive strips 840. The material forming the protective covers 802 functions as a release sheet that is peeled off prior to applying the corner sealing polymeric material 800 to an inside corner or an outside corner between sheathing panels 100.

Figure 9C:
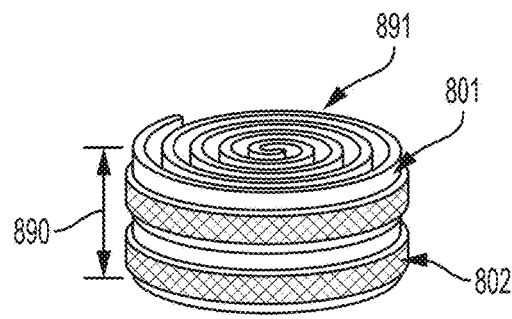
Figure 9D:
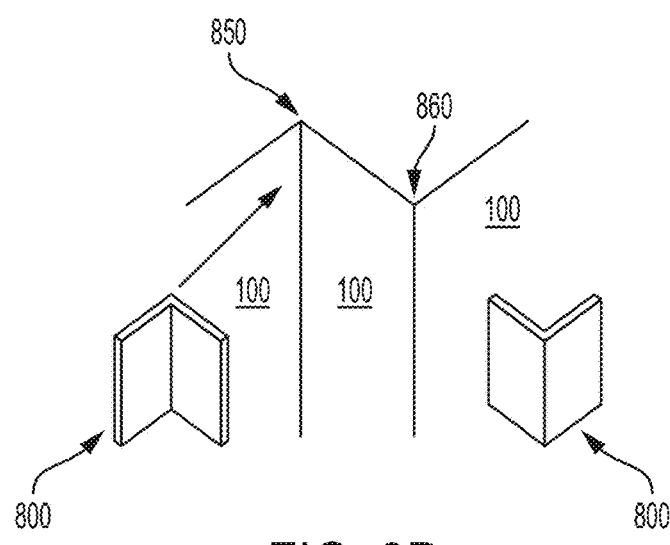

In some embodiments, the corner sealing polymeric material 800 may be wound into a roll 891 form (of FIG. 9C). The protective covers 802 and adhesive strips 840 may be arranged on the outside of the roll 891, as shown in FIG. 9C, or on the inside, facing the core of the roll 891 (not shown). Instead of a roll 891, the tape 800 also may be provided as individual strips having discrete or pre-defined lengths. When the corner sealing polymeric material 800 is in a roll 891 form, individual strips of the corner sealing polymeric material 800 can then be cut to the desired length, which depends on on the length of the individual corner. The corner sealing polymeric material 800 can be stored or shipped in a flat state, or in the form of the roll 891.

The dimensions of the corner sealing polymeric material 800 can vary and depend on the desired application. The width 890 of the corner sealing polymeric material 800 (of FIG. 9C) may generally vary and is not intended to be limited. In some embodiments, the width 890 of the tape is in a range from about 1 inch to about 18 inches, or from about 3 inches to about 12 inches.

To install the corner sealing polymeric material 800, for example, in an inside corner 850 or an outside corner 860 between sheathing panels 100 (as shown in FIG. 9D), the corner sealing polymeric material 800 is aligned in the corner, with the hinge 801 arranged in alignment with the corner between the panels 100. When the tape 800 includes two individual adhesive strips 840, one on each side of the hinge 801, the protective covers 802 can be removed sequentially after aligning the corner sealing polymeric material 800 in the corner. For example, an upper edge of the corner sealing polymeric material 800 may be aligned in the corner (i.e., by aligning with an upper edge of a panel 100), and then one of the protective covers 802 is removed to expose one adhesive strip 840. One side of the corner sealing polymeric material 800 with the exposed adhesive strip 840 can be pressed onto one of the panels 100 in the corner, while the adhesive strip 840 on the opposing side remains protected. This allows for better alignment in the corner. Then after the adhesive strip 840 on the first side (panel 100) is secure, the second protective cover 802 can be removed and the adhesive strip 840 then pressed onto the other panel 100. When the corner sealing polymeric material 800 is in a roll 891 form, a strip can be unrolled and cut before applying to the corner. Alternatively, a portion of the corner sealing polymeric material 800 can be unrolled and pressed onto the panels 100 before cutting. After proper positioning and adhesion in the inside corner 850 or outside corner 860, each adhesive strip 840 runs substantially parallel to the longitudinal joint/corner between the panels 100, with one adhesive strip 840 on each panel 100. The hinge 801 of the tape 800 is also disposed within and runs substantially parallel to the inside corner 850 or outside corner 860.

The polymeric material forming the corner sealing polymeric material 800 is water-resistant. The corner sealing polymeric material 800 forms a water-resistant seal at any corner or joint between adjacent sheathing panels 100 (for example, as shown in FIG. 9D).

Although the corner sealing polymeric material 800 is described above for use in sealing a corner between adjacent sheathing panels 100, the corner sealing polymeric material 800 is not limited to use in corners. For example, in some embodiments, the corner sealing polymeric material 800 can be used to for flashing around edges and/or corners of windows and doors. The corner sealing polymeric material 800 may also be used to seal a gap between any surfaces arranged at any angle. Because the corner sealing polymeric material 800 is stiff and bendable, it can be shaped to fit and seal any joint or interface between any two surfaces.

According to embodiments, a sheathing panel includes a barrier overlay secured to a panel; wherein the sheathing panel is bulk water resistant and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

In some embodiments, the panel is a lignocellulose composite panel.

In other embodiments, the barrier overlay is secured to the panel with an adhesive.

In embodiments, the sheathing panel further includes at least one pigment layer arranged on the barrier overlay.

In some embodiments, the sheathing panel further includes an anti-skid coating arranged on the barrier overlay. The anti-skid coating may be substantially free of texture as seen by the naked eye. The anti-skid coating may provide the sheathing panel with a dry coefficient of friction of at least 0.6. The anti-skid coating may be substantially free of embossing.

In embodiments, a surface of the barrier overlay secured to the panel is substantially smooth.

In some embodiments, the panel includes at least two layers. Two of the layers may be a lignocellulosic layer and a foam layer.

In other embodiments, the barrier overlay and the panel each have a water vapor permeance of at least 1.3 perms as determined by ASTM E96-15 procedure A at 73° F. and 50% relative humidity (RH).

Yet in other embodiments, the sheathing panel further includes drainage spacers arranged on the barrier overlay.

Still yet, in other embodiments, a sheathing panel system includes at least two adjacent panels, each panel having an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other; a barrier overlay secured to the outer surface or the inner surface of each panel; and a means for sealing the longitudinal joint between the two adjacent panels; wherein each panel is bulk water resistant and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

In some embodiments, the barrier overlay includes a paper with a water resistant barrier layer.

In other embodiments, the sheathing panel system further includes an anti-skid coating arranged on the barrier overlay. The anti-skid coating may cover about 1 to about 10% of the surface area of the barrier overlay.

In embodiments, the means for sealing the longitudinal joint is a water resistant tape.

Yet in some embodiments, the longitudinal joint occurs at an acute or obtuse angle.

Still yet, in other embodiments, the means for sealing the longitudinal joint is a strip of polymeric material having two sides, a first side and a second side, with a longitudinal hinge running substantially parallel to the longitudinal joint between the two adjacent panels and extending between the two sides of the strip of polymeric material. The longitudinal hinge may be more flexible than the two sides of the strip of polymeric material.

In other embodiments, the means for sealing the longitudinal joint comprises two adhesive strips running substantially parallel with the longitudinal joint, with each adhesive strip arranged on each of the two panels. The two adhesive strips may include a pressure sensitive adhesive. The two sides of the strip of polymeric material may have a thickness in a range from about 0.008 inch to about 0.20 inch.

In some embodiments, a method of making a sheathing panel includes applying a weather-resistant coating to a paper to form a barrier overlay; and securing the barrier overlay to a panel; wherein the sheathing panel is bulk water resistant and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

In other embodiments, the panel is a pressed oriented strand board, plywood, or a combination thereof.

Yet in other embodiments, the method further includes disposing an anti-skid coating on the weather-resistant coating. The anti-skid coating may provide sheathing panel with a dry coefficient of friction of at least 0.6. The anti-skid coating may be substantially free of embossing. The anti-skid coating may be disposed by a controllable application process, and the controllable application process is rotogravure, printing, or spray-coating.

Still yet, in some embodiments, a sheathing panel includes a barrier overlay secured to a panel with a layer of adhesive, the barrier overlay including a paper having a water-resistant coating disposed on a surface of the paper; wherein the sheathing panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

In embodiments, the panel is a lignocellulose composite panel.

In some embodiments, the sheathing panel further includes at least one pigment layer arranged on the barrier overlay.

In other embodiments, the sheathing panel further includes an anti-skid coating arranged on the water-resistant coating. The anti-skid coating may provide the sheathing panel with a dry coefficient of friction of at least 0.6.

Yet in other embodiments, a sheathing panel includes a barrier overlay secured to a panel, the barrier overlay including a paper having a water-resistant coating disposed on a surface of the paper; and an anti-skid coating disposed on the water-resistant coating; wherein the sheathing panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

Still yet, in other embodiments, the anti-skid coating is substantially free of embossing.

In embodiments, the barrier overlay is water-resistant paper with a water-resistant layer or coating.

In some embodiments, the anti-skid coating provides the sheathing panel with a dry coefficient of friction of at least 0.6.

In other embodiments, a sheathing panel system includes at least two adjacent panels, each panel having an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other; a barrier overlay secured to the outer surface or the inner surface of each panel with a layer of adhesive, the barrier overlay including a paper having a water-resistant coating disposed on a surface of the paper; and a means for sealing the longitudinal joint between the two adjacent panels; wherein each panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

Yet in other embodiments, the sheathing panel system further includes an anti-skid coating arranged on the barrier overlay. The anti-skid coating may cover about 1 to about 100% of the surface area of the barrier overlay.

Still yet, in other embodiments, the means for sealing the longitudinal joint is a water resistant tape. The longitudinal joint may occur at an acute or obtuse angle.

In other embodiments, the means for sealing the longitudinal joint is a strip of polymeric material having two sides, a first side and a second side, with a longitudinal hinge running substantially parallel to the longitudinal joint between the two adjacent panels and extending between the two sides of the strip of polymeric material. The longitudinal hinge may be more flexible than the two sides of the strip of polymeric material.

In some embodiments, the means for sealing the longitudinal joint comprises two adhesive strips running substantially parallel with the longitudinal joint, with each adhesive strip arranged on each of the two adjacent panels. The two adhesive strips may include a pressure sensitive adhesive.

In embodiments, the two sides have a thickness in a range from about 0.008 inch to about 0.20 inch.

In some embodiments, a sheathing panel system includes at least two adjacent panels, each panel having an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other; a barrier overlay secured to the outer surface or the inner surface of each panel with a layer of adhesive, the barrier overlay comprising a paper having a water-resistant coating disposed on a surface of the paper and an anti-skid coating disposed on the water-resistant coating; and a tape sealing the longitudinal joint between the two adjacent panels, the tape being water resistant, air impermeable, or both; wherein each panel is bulk water resistant and has at least one of the following properties: a water vapor transmission rate of about 7.0 to about 60.0 grams per square meter per 24 hours (grams/m$^2$/24 hours) as determined by ASTM E96-15 procedure A at 73° F. and 50% relative humidity (RH), a water vapor permeance of about 1.5 to about 25.0 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

In other embodiments, the panel is a lignocellulose composite panel.

Yet, in other embodiments, the tape is no more water vapor permeable as each panel.

Still yet, in other embodiments, the water-resistant coating does not substantially impregnate or substantially penetrate the paper.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A sheathing panel, comprising:
  a barrier overlay secured to a panel, the barrier overlay comprising a base paper and a water-resistant coating arranged on a surface of the base paper such that the water-resistant coating does not substantially impregnate or penetrate the base paper; and
  an anti-skid coating arranged on the water-resistant coating on the barrier overlay, the anti-skid coating being substantially smooth, comprising a polymer, substantially invisible to a naked eye, and covering about 1 to about 10% of a surface area of the base paper of the barrier overlay;
  wherein the sheathing panel is bulk water resistant and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

2. The sheathing panel of claim 1, wherein the panel is a lignocellulose composite panel.

3. The sheathing panel claim 1, wherein the barrier overlay is secured to the panel with an adhesive.

4. The sheathing panel of claim 1, further comprising at least one pigment layer arranged on the barrier overlay.

5. The sheathing panel of claim 1, wherein the anti-skid coating is substantially free of embossing.

6. The sheathing panel of claim 1, wherein the panel comprises at least two layers.

7. The sheathing panel of claim 6, wherein two of the layers are a lignocellulosic layer and a foam layer.

8. The sheathing panel of claim 1, wherein the barrier overlay and the panel each has a water vapor permeance of at least 1.3 perms as determined by ASTM E96-15 procedure A at 73° F. and 50% relative humidity (RH).

9. The sheathing panel of claim 1, further comprising drainage spacers arranged on the barrier overlay.

10. The sheathing panel of claim 1, wherein the anti-skid coating further comprises a dye, pigment, ink, or any combination thereof.

11. The sheathing panel of claim 1, wherein the anti-skid coating comprises a repeating pattern.

12. A sheathing panel system, comprising:
at least two adjacent panels, each panel having an outer surface, an inner surface, and at least one edge extending therebetween, wherein each panel is aligned with its at least one edge proximate to the at least one edge of the adjacent panel to define a longitudinal joint between the two adjacent panels, and wherein the edges of the adjacent panels are substantially parallel to each other;
a barrier overlay secured to the outer surface or the inner surface of each panel, the barrier overlay comprising a base paper and a water-resistant coating arranged on a surface of the base paper such that the water-resistant coating does not substantially impregnate or penetrate the base paper;
an anti-skid coating arranged on the water-resistant coating on the barrier overlay, the anti-skid coating being substantially smooth, comprising a polymer, substantially invisible to a naked eye, and covering about 1 to about 10% of a surface area of the base paper of the barrier overlay; and
a means for sealing the longitudinal joint between the two adjacent panels;
wherein each panel is bulk water resistant and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

13. The sheathing panel system of claim 12, wherein the means for sealing the longitudinal joint is a water resistant tape.

14. The sheathing panel system of claim 12, wherein the means for sealing the longitudinal joint is a strip of polymeric material having two sides, a first side and a second side, with a longitudinal hinge running substantially parallel to the longitudinal joint between the two adjacent panels and extending between the two sides of the strip of polymeric material.

15. A method of making a sheathing panel, the method comprising:
applying a weather-resistant coating to a paper to form a barrier overlay, the barrier overlay comprising a base paper and the weather-resistant coating arranged on a surface of the base paper such that the weather-resistant coating does not substantially impregnate or penetrate the base paper; and securing the barrier overlay to a panel; and disposing an anti-skid coating arranged on the water-resistant coating on the barrier overlay, the anti-skid coating being substantially smooth, comprising a polymer, substantially invisible to a naked eye, and covering about 1 to about 10% of a surface area of the base paper of the barrier overlay;

wherein the sheathing panel is bulk water resistant and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11.

16. The method of claim 15, wherein the panel is a pressed oriented strand board, plywood, or a combination thereof.

17. The method of any of claim 15, wherein the anti-skid coating is substantially free of embossing.

* * * * *